No. 889,913. PATENTED JUNE 9, 1908.
J. M. DOVE, J. S. BANCROFT & M. C. INDAHL.
TYPE COMPOSING MACHINE.
APPLICATION FILED APR. 22, 1907.

No. 889,913. PATENTED JUNE 9, 1908.
J. M. DOVE, J. S. BANCROFT & M. C. INDAHL.
TYPE COMPOSING MACHINE.
APPLICATION FILED APR. 22, 1907.

No. 889,913. PATENTED JUNE 9, 1908.
J. M. DOVE, J. S. BANCROFT & M. C. INDAHL.
TYPE COMPOSING MACHINE.
APPLICATION FILED APR. 22, 1907.

UNITED STATES PATENT OFFICE.

JOHN MAURY DOVE, OF WASHINGTON, DISTRICT OF COLUMBIA, AND JOHN SELLERS BANCROFT AND MAURITZ C. INDAHL, OF PHILADELPHIA, PENNSYLVANIA, ASSIGNORS TO LANSTON MONOTYPE MACHINE COMPANY, OF PHILADELPHIA, PENNSYLVANIA, A CORPORATION OF VIRGINIA.

TYPE-COMPOSING MACHINE.

No. 889,913.   Specification of Letters Patent.   Patented June 9, 1908.

Application filed April 22, 1907. Serial No. 369,625.

*To all whom it may concern:*

Be it known that we, JOHN MAURY DOVE, of Washington, District of Columbia, and JOHN SELLERS BANCROFT and MAURITZ C. INDAHL, both of Philadelphia, in the county of Philadelphia and State of Pennsylvania, have invented certain new and useful Improvements in Type-Composing Machines; and we do hereby declare the following to be a full, clear, and exact description of the same, reference being had to the accompanying drawings, forming a part of this specification, and to the figures and letters of reference marked thereon.

This invention relates to type making and composing, type setting and like machines and has for its principal object the suppression or "killing" of defective or undesirable matter in process of composition and preventing the delivery of the same to the galley.

In the use of composing machines it not infrequently happens that while setting up a line of matter the operator discovers an error therein which renders it desirable or expedient to suppress the line and substitute another. Ordinarily but two alternations are presented; to suspend composition and remove or wipe out the defective matter (type or controller) or send it forward to the galley to be subsequently discovered and removed. The first named plan is preferable in that it permits the correction to be made at the time of its discovery and by the operator responsible therefor, and at the same time facilitates a correct disposition of the matter following; but the means available for the purpose involve such a loss of time in effecting the removal or suppression of the composed matter that the second and less desirable plan is more frequently adopted, *i. e.*, that of sending the defective matter forward to the galley, trusting to its subsequent discovery and removal and the consequent rearrangement of following matter. This is more especially true in the case of automatic machines or systems employing a controller or preliminary representation device upon which the matter is composed or set up in the form of consecutive signals or perforations formed in a record strip, the latter subsequently operating to govern the selecting and assembling devices of an automatic machine. While it is possible to correct such a record strip by the elimination of perforations representing the matter to be suppressed (as by applying pasters, or cutting out sections) it is not practical from an economic point of view to do so, hence it has heretofore been customary to send the matter forward to the galley for correction, to do which it is necessary, in order to avoid arresting the action of the selecting and assembling devices, to fill out and justify the line containing the errors, that it may pass the automatic long and short line detectors.

The present invention, which is designed to overcome these obstacles and facilitate the ready removal or throwing out of undesirable matter immediately the same is composed, consists, first, in providing the assembling devices with means for cutting out or discharging defective lines; second, in rendering said cutting-out devices subject to the control of the compositor; third, in controlling the cutting out or line expelling devices through the medium of the record strip; and, fourth, in the means for effecting the foregoing actions and operations.

In the accompanying drawings illustrating a preferred form of embodiment of the invention.

Corresponding numerals designate like parts in the several figures.

Figures 1, 6:
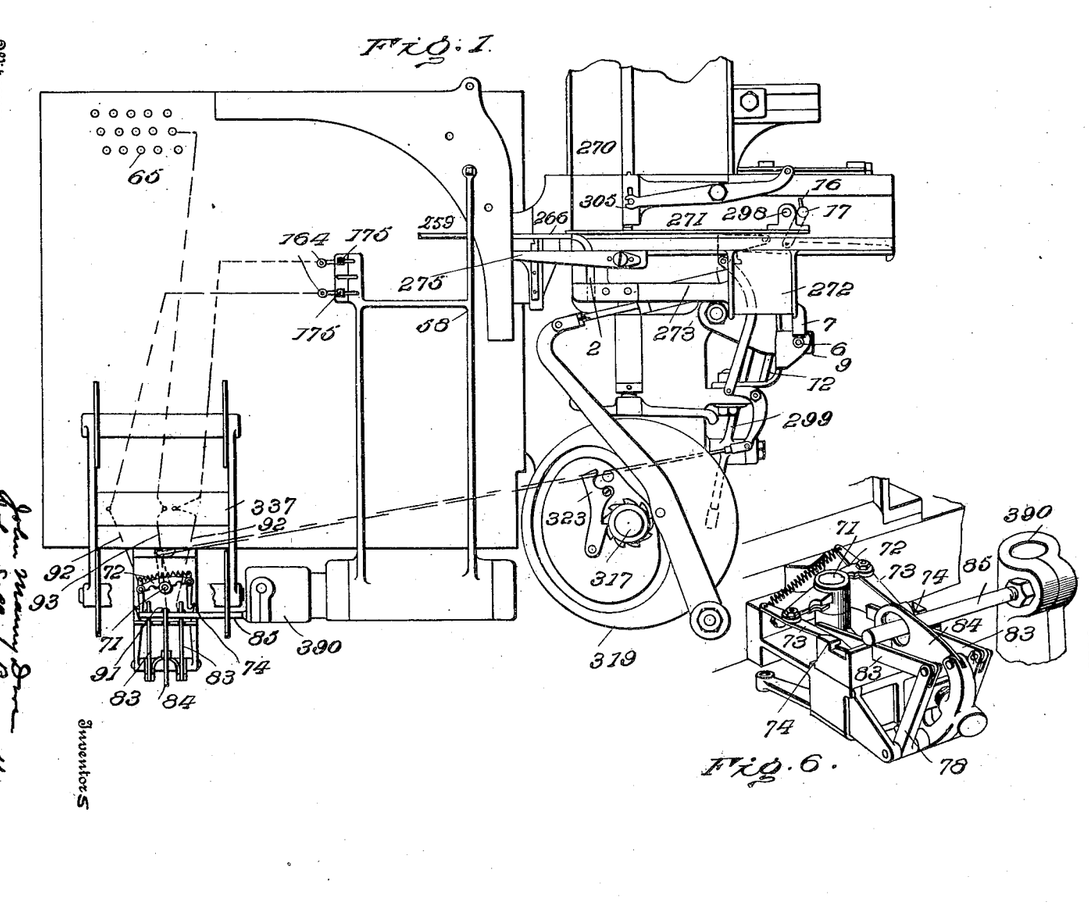
Figure 1 is a top plan view of the line suppressing or killing mechanism applied to a type composing machine.
Fig. 6 is a perspective view of a portion of the signal interpretating mechanism.

For purposes of illustration the invention is shown as embodied in or applied to the type casting and composing machine of Patent No. 625,998, dated May 30, 1899, said machine being diagrammatically represented in Fig. 1 by the parts with which the improvements are more directly associated, such as, actuating lever 58 for the centering pin; pivoted trips 175 for the justifying wedges; plungers 164 controlling said trips; stop-pins 65 of the die-case centering mechanism; ejector blade 259; line channel 266; galley 270; galley blade 271 with its rod 298 and actuating lever 299; line carrier 275 with its actuating slide 287; line transfer bar 273 with its lever 272; galley shaft 317; cam wheel 319 coupled with galley blade, line carrier and line transfer bar; clutch 323 for coupling galley shaft and cam wheel; trip block 305; cross bar 337 of the paper feed mechanism containing the control parts; and lever 390 of the die case centering mechanism.

The manual operations incident to composition are performed at a separate machine, known as the keyboard perforator, by means of which a preliminary representation is produced in the form of a strip of paper bearing at regular intervals perforations representing individual characters, points and spaces arranged in the order of composition, and, at the end of each line, two consecutive signals, known as the justification signal, each comprising a designating perforation coupled with a dimensioning perforation. This record strip is fed or delivered to the automatic composing or casting machine in the reverse order from that in which it passed through the keyboard, so that the justification signals will precede the type signals for each line of composition. The justification signals operate to set the machine to deliver space type of proper dimensions to fill or justify the line when associated with the designated character type, and each of said signals acts through its designating perforation 63 upon one of the trips 175 to bring into action one of the adjusting members, and by its dimensioning perforation 64 to determine the position of adjustment of said member at the same time acting through clutch 323 to couple cam wheel 319 with its driving shaft 317, to start the galley mechanism in operation.

The signals representing the composed line operate to select and deliver the type designated thereby, one after another in regular order, into line channel 266, and when all the type for a line are thus delivered by the ejector blade 259 the justification signals pertaining to the next succeeding line starts the galley mechanism in action, to transfer the completed line to the galley 270, which is accomplished by causing the hook ends of the line carrier 275 to advance laterally behind the last type and then move bodily outwards until in line with the inner wall of the galley, thus bringing the composed line opposite the entrance to the galley. The galley blade 271 is now elevated, and the line transfer bar 273 advanced to push the line beneath the blade into the galley, followed by a partial descent of the blade, to engage and support the line; the withdrawal or retraction of the line transfer bar; the lateral movement of the line carrier, to avoid the accumulating type in the line channel; the return of the type carrier to its initial position opposite the entrance end of the line channel; and the disengagement of clutch 323, thus completing the cycle of operations pertaining to the line assembling devices.

The mechanism and operations as thus far mentioned are those of the prior patented machine and are merely referred to here as aids to an understanding of the present invention. The proposition presented, as applied to this mechanism, is to dispose of matter set up in the line channel so that it will not enter the galley, and to do this automatically and under control of the record strip. With these ends in view provision is made for opening up a path through which the matter contained in the line channel may be diverted from the galley and discharged, said path being closed or blocked under normal conditions of delivery.

Figures 2, 7:
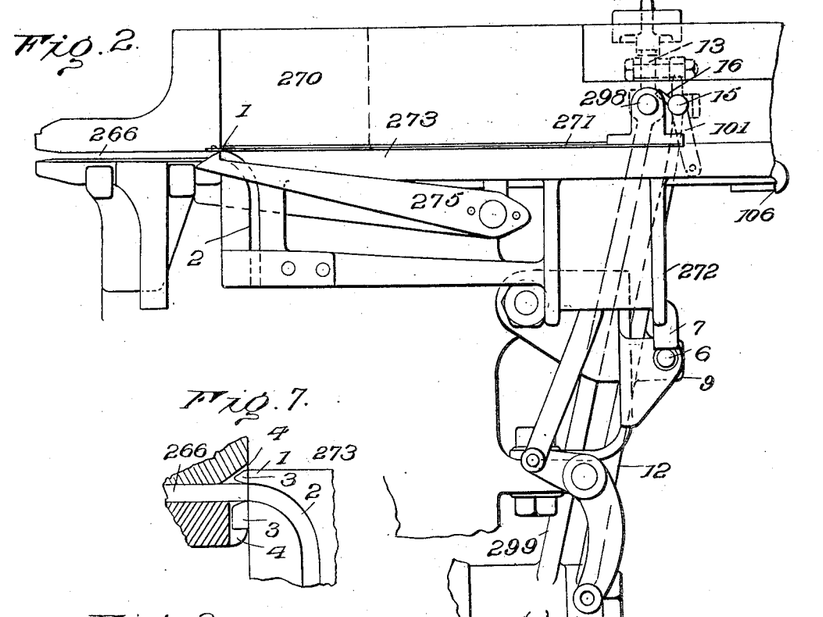
Fig. 2 is a top plan view of a portion of the galley mechanism on an enlarged scale, with the improvements applied thereto.
Fig. 7 is a detail view showing the discharging channel of the line transferrer.

As heretofore constructed and used the inner end of line transfer bar 273 or that next the fixed portion of the line channel operates as a gate to close said channel when the line transfer bar is advanced to deliver a line of type to the galley. It is proposed, therefore, to reduce or narrow this end of the line transfer bar, as at 1, so that when in its forward position said bar, in lieu of covering, will uncover the discharge end of the line channel, thus presenting an open path through which type contained in the line channel may be ejected. In order to provide means for directing and controlling the escape of the discharged type, the inner end of the transfer bar instead of being wholly removed in rear of the reduced portion 1 is preferably formed or provided with a groove or channel 2 corresponding to or exceeding in width the line channel and registering with the latter when the transfer bar is in its advanced position; said groove or channel being curved, if desired, to deliver the type at some convenient point in rear of the transfer bar; and to facilitate the passage of the type the inner end of the transfer bar 273 is provided on opposite sides of channel 2 with projections 3, Fig. 7, provided with inclined faces merging into the opposite walls of channel 2 and the front face of the transfer bar, said projections riding in a guide 4 of less depth than and intersecting the walls of the fixed line channel, and serving as guides for directing the type past the joint connecting the line channel and discharge channel 2 on the one hand, and the line channel and the continuation thereof between the galley blade and transfer bar on the other.

Figures 3, 8:
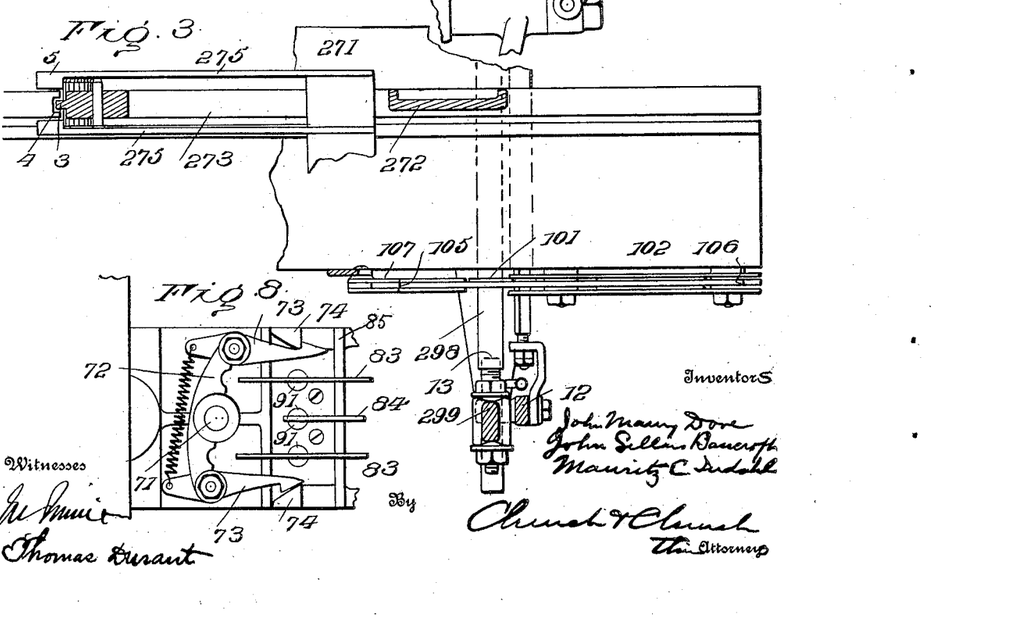
Fig. 3 is a side elevation, partly in section, showing the line carrier, and a portion of the signal interpretating and transfer-bar locking mechanisms.
Fig. 8 is a top plan view of the devices shown in Fig. 6.
Figure 4:
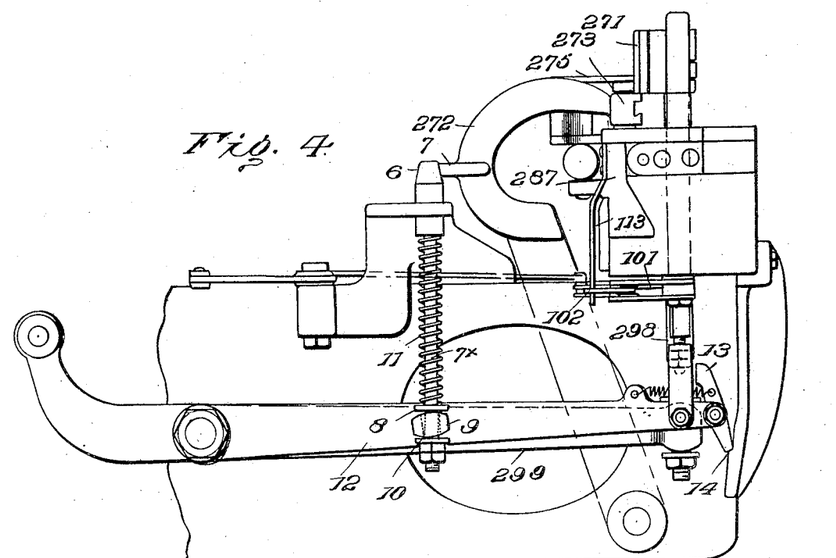
Fig. 4 is an end elevation of the galley mechanism showing the locking devices for the line transferrer and a portion of the signal interpretating mechanism.
Figures 5, 9:
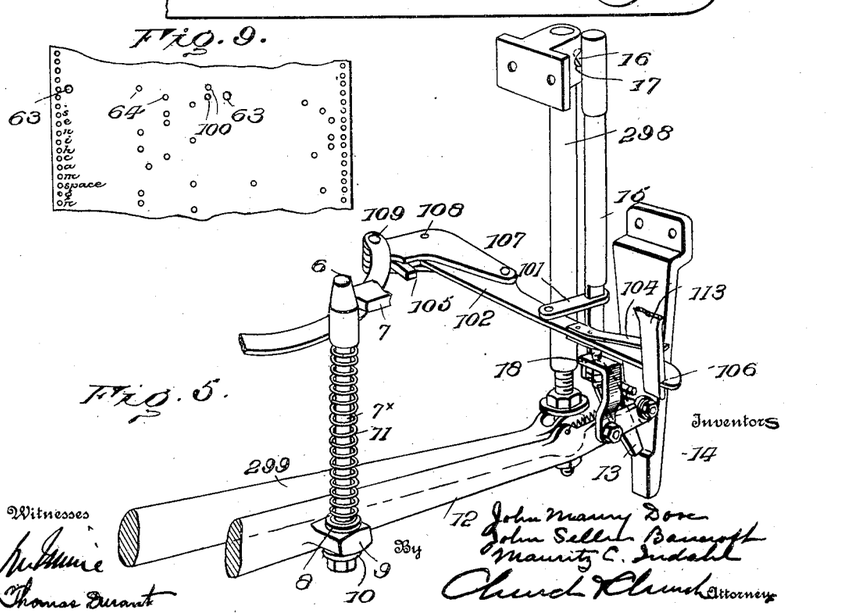
Fig. 5 is a perspective view of the transfer-bar locking bolt and its actuating mechanism detached.
Fig. 9 is a section of the perforated strip or controller containing the line killing signals.

The discharge end of the line channel being opened, it is obvious that any suitable means may be employed to force the type therefrom; but in the preferred embodiment illustrated this office is assigned to the line carrier 275 which is well adapted for the purpose, the only change required being a slight increase in the interval between its two blades, to permit the passage of the type between them, and a slight widening of the hooks in a vertical plane, as at 5, Fig. 3, to bring them into the plane of the type standing in the line channel. In other respects said line carrier is constructed and operates as before, being swung on its pivot to bring the hooks into the plane of the line channel in rear of the type contained therein and then drawn outwards or towards the galley, forcing the type out through channel 2 in the line transfer bar, if the latter is at the time in its forward position, or in front of said bar, if in retracted position.

It is of course necessary that the discharge end of the line channel should remain uncovered or open during the removal of the type, and in the present instance this is accomplished by a movable abutment or locking bolt 6 working in guides on the frame in position to engage a shoulder 7 on the line transfer lever 272 when the latter is advanced to bring the discharge channel 2 in alinement with the line channel 266. Bolt 6 is normally retained in retracted position or out of engagement with lever 272 so as not to interfere with the latter in its movements; but when it is desired to suppress or kill a line of matter contained in the line channel, and the transfer bar is advanced for the purpose, bolt 6 is moved to active position where it will intercept and thereby prevent the return of the transfer bar. To insure the proper seating and facilitate the withdrawal of the bolt its engaging face is slightly inclined to the plane of movement, as shown.

The equipment thus far described is sufficient to enable a line of matter deposited in the line channel by the composing mechanism to be discharged either manually or automatically whenever bolt 6 is engaged to lock the transfer bar in its advanced position, as after the delivery of a completed line, in which latter event, channel 2 being in register with line channel 266, when the galley mechanism is next set in motion, through the medium of the justification signal or otherwise, the line carrier will operate to discharge the assembled line through channel 2 in the same manner that it would deliver it opposite the galley and in front of the line transfer bar if the latter retained its normal or retracted position. It only remains, therefore, to explain how the locking action may be automatically effected and controlled from the record strip so as to place the line discharging or canceling function under the immediate control of the compositor at the keyboard. With these ends in view locking bolt 6 is secured to a rod $7^\times$ extending loosely through a washer 8 and bearing 9, and provided with a nut or head 10 below said bearing. A spring 11 interposed between washer 8 and bolt 6 serves to hold the head 10 in elastic engagement with bearing 9, so as to permit free motion of said bearing when the bolt is seated, or in the event it encounters an obstruction during the locking motion; it also assists in seating bolt 6 when engaging its bearing 7, on the transfer bar lever 272. Bearing 9 is carried by a lever 12, the latter pivotally supported on the axis of galley blade actuating lever 299 and provided with a retainer in the form of spring actuated pawl 13, in position to engage a tooth or shoulder 14 on an extension of the frame when bolt 6 is in its advanced position to lock the transfer bar. Supported to both rotate and reciprocate in bearings on the frame and in parallel with galley blade rod 298 is a rod 15 whose upper end carries an offset or pin 16 in position to enter a notch 17 in the head of the galley blade, while its lower end is swiveled in a link 18 carried by lever 12. The purpose of this arrangement is to permit lever 12 to be coupled at will with the galley blade actuating devices by a rotary movement of rod 15 so that when the galley blade is elevated and transfer bar 273 is advanced to deposit an assembled line in the galley, lever 12 will be elevated to bring bolt 6 into position behind bearing 7 and carry pawl 13 above its engaging shoulder 14. The partial descent of the galley blade, to locate its lower edge behind the line of type in front of the transfer bar seats pawl 13, thereby sustaining bolt 6 in locking position and preventing the retraction of the transfer bar and the further descent of the galley blade during the time cam wheel 319 is completing its movement and until said lever 12 is again released and permitted to descend. Thus while a line is being deposited in the galley, the transfer bar 273 is advanced and locked with its channel 2 in alinement with line channel 266, the machine being so set or adjusted that when the galley mechanism is again set in motion, as by the next justification signal, the type assembled in the line channel in the interval between the passage of the two justification signals, will be forced by the line carrier into and through discharge channel 2 and thus be diverted from the galley.

The parts are restored to normal position, after the discharge of a rejected line, by the engagement of lever 299 with the heel of pawl 13 during the movement of said lever incident to the next succeeding action of the galley mechanism inaugurated by the passage of a justification signal. Levers 299 and 12 are locked together by the engagement of pin 16 in notch 17 while said levers are in their retracted or lower position which time lever 299 is out of engagement with pawl 13 and said levers are disconnected, as by the withdrawal of pin 16 from notch 17, when the galley blade has descended below the heads of the type and while held by its cam above the transfer bar. In this position pawl 13 is engaged to prevent the further descent of lever 12, while lever 299 and its connections is sustained by the galley blade, the latter resting upon and being supported by the for the time being stationary transfer bar. Upon the next upward movement of lever 299 pawl 13 will be engaged and retracted, so as to permit the descent of lever 12 and with it bolt 6 in advance of the descent of lever 299.

Figures 10, 11:
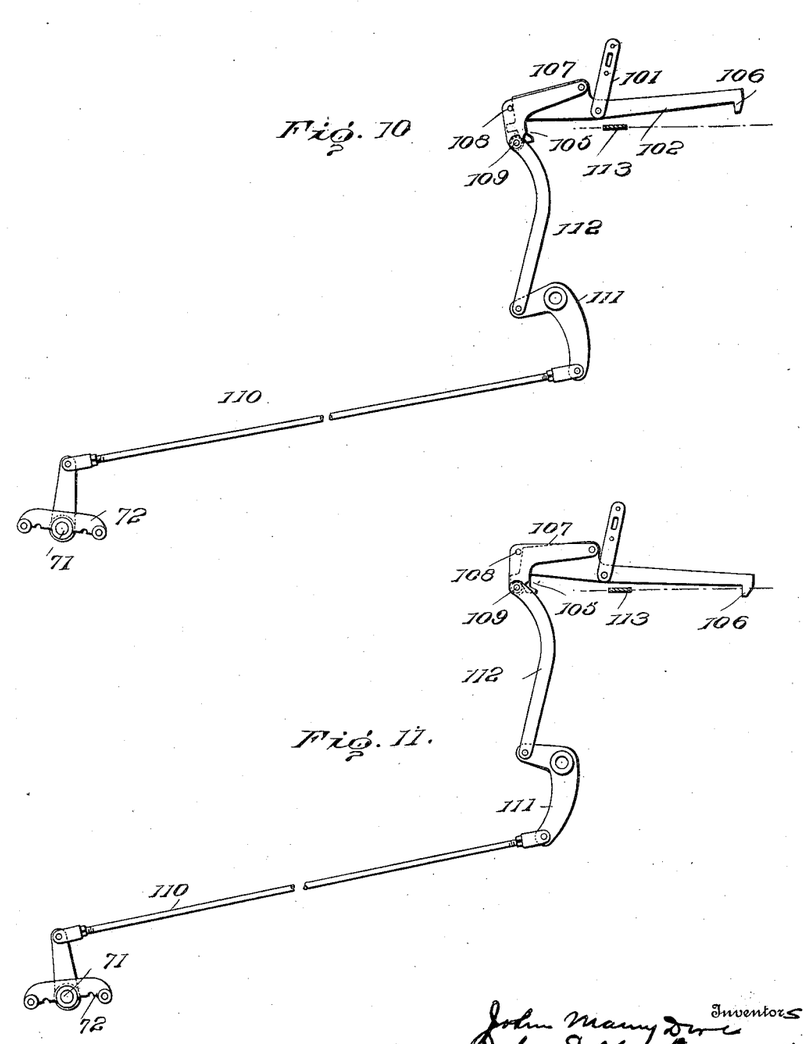
Figs. 10, 11, 12 and 13, are top plan views of a portion of the signal interpretating mechanism showing the devices for controlling the transfer bar locking bolt in different positions.
Figures 12, 13:
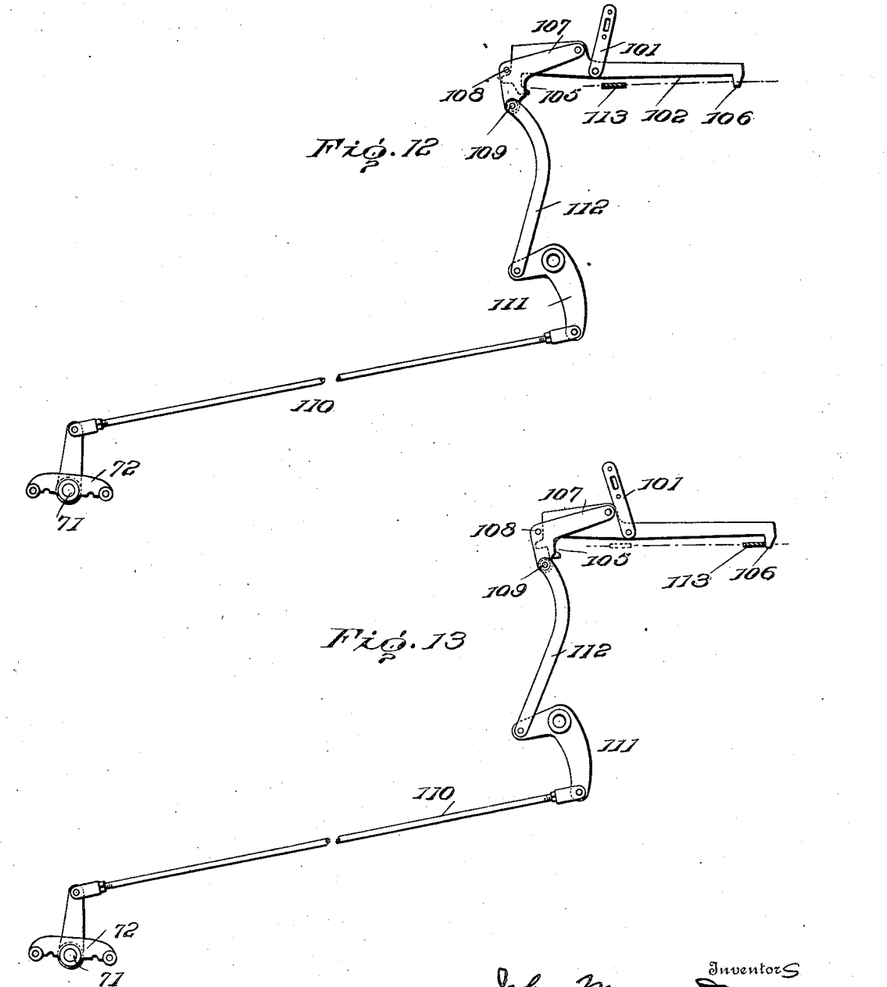

From the foregoing it is apparent that rod 15 constitutes the controlling element of the automatic line suppressing mechanism illustrated, and that it is only necessary to couple said shaft with suitable actuating devices under the control of the record strip to enable the compositor at the keyboard to dictate and effect the discharge of any line of composition. A signal interpreting mechanism competent for the purpose is disclosed in and has been borrowed from Patent No. 700,288, granted May 20, 1902, where it is employed as a controller for a leading mechanism; but it is obvious that other forms may be employed. In the preferred form illustrated said mechanism comprises arm 101 applied to rod 15 in a manner to permit independent longitudinal, while preventing independent lateral, movement of said rod; switch bar 102 provided with engaging shoulders 105, 106, at opposite ends and a frictional retainer 104, said switch bar being pivotally coupled with the outer end of arm 101 and arranged to reciprocate longitudinally in ways on the frame; arm 113 attached to the line carrier actuating slide 287 in position to engage the shoulders on the switch bar; shunting lever 107 pivoted to switch bar 102 and provided with shoulders 108, 109, for engaging said bar; oscillating shaft 71 provided with cross-head 72 and coupled with shunting lever 107 through connections 110, 111 and 112; latches 73 pivoted in the arms of cross head 72 and adapted to alternately engage locking shoulders 74 on the frame; lever frame 78 carrying notched link 84 and pivoted arms 83 for engaging latches 73 and actuating cross head 72; pin 85 carried by die-case centering lever 390; plungers 91 for operating arms 83 and link 84; air passages 92 controlling the plungers of arms 83 and each communicating with the port in crossbar 337 pertaining to one of the plungers 164; and an air passage 93 controlling the plunger of link 84 and communicating with a port in cross bar 337 pertaining to one of the stop-pins 65. Briefly stated, the operation of this mechanism is as follows: When in normal or inoperative position, Fig. 10, (that is, with rod 15 turned to withdraw pin 16 from notch 17 and thereby disconnect the galley blade devices from lever 12) switch bar 102 occupies its extreme inward or left hand position with shunting lever 107 covering shoulder 105, and its opposite end carrying shoulder 106 tilted back out of the path of arm 113, said switch bar having been brought to this position by the engagement of arm 113 with shunting lever 107, the latter locked in position by one of the latches 73 on cross head 72. It is to be noted that the admission of pressure beneath the plungers 91 of arms 83 and the consequent elevation of said arms into the path of cross head 72 is ineffective without a concurrent admission of pressure beneath the plunger of link 84, the former serving merely to designate which arm of the cross head is to be operated upon, while the latter effects a coupling of the selected arm with the driving pin 85. If, now, the arm pertaining to the for the time being forward arm of cross head 72 is elevated by its plunger and at the same time link 84 is also elevated by its plunger to engage pin 85, the cross head will be tilted and, through the connecting devices, shunting lever 107 will be moved back, shoulder 108 engaging switch bar 102 and tilting the latter to bring shoulder 106 into the path of arm 113, as in Figs. 11 and 12. During the outward movement of arm 113 it will engage shoulder 106 and shift switch bar 102 outward or to the right as in Fig. 13, in a direction to cause pin 16 to enter notch 17, and if, prior to the excursion of arm 113 in the opposite direction, shunting lever 107 is advanced into the path of said arm, thereby covering shoulder 105 (see Fig. 13) switch bar 102 will again be shifted longitudinally, to withdraw pin 16 from notch 17 and at the same time will be tilted to withdraw shoulder 105 from the path of arm 113. To effect and control the action described it is only required that there should be associated with each of the two sets of perforations 63, 64, constituting the justification signal, a special perforation 100, the latter controlling the port communicating with the plunger 91 of link 84, so that first one arm 83 and then the other will be brought into action conjointly with link 84 to first bring switch bar 102 into the path of arm 113 and cause the engagement of pin 16 in notch 17, and then set shunting lever 107 in position to effect the withdrawal of pin 16 and the return of the switch bar to normal position.

The fact is to be noted that the line carrier actuating slide to which arm 113 is attached occupies an intermediate position when the galley mechanism is at rest, and when the latter is started up said slide first moves outwardly or towards shoulder 106 of switch bar 102 to draw the assembled line of type towards the galley, then moves in the opposite direction or towards shoulder 105 to return the carrier arms to the entrance of said channel, after which the slide returns to its intermediate position and is there arrested.

*Summary of operation.*—The compositor observing a defect and desiring to suppress the line closes it at any stage by forming any justification signal, at the same time touching a key to produce the special perforations 100 in conjunction with each designating perforation, and then proceeds with the composition of the next line. In the automatic composing machine the justification signals preceding the character signals for the line, and the first designating perforation 63 in conjunction with the special perforation 100 starts the galley mechanism in action, at the same time tilting switch bar 102 to present its shoulder 106, Fig. 11. The next designating perforation 63 and special perforation 100, shifts shunting lever 107 (Fig. 12) without, however, changing the position of the switch bar. As the line carrier actuating slide 287 moves outwards, to deliver the previously assembled line to the galley, arm 113, engaging the switch bar (Fig. 13) turns rod 15 and causes pin 16 to enter notch 17 in the galley blade. The galley blade now rises carrying with it lever 12, and as line transfer bar 273 advances to push the line beneath the galley blade into the galley, bolt 6 is advanced to lock said transfer bar with discharge channel 2 in alinement with the line channel in which latter the type for the line to be canceled are now being assembled. While the transfer bar is thus held the line carrier is returned to the entrance end of the line channel by its slide 287 in doing which arm 113 engages the shunting lever 107 to retract and tilt switch bar 102 and withdraw pin 16. Thus matters stand while the type of the defective line or section of line is being set up and until the next succeeding justification signal arrives, whereupon, the galley mechanism being again set in motion, the type carrier discharges the assembled type into the channel 2, and as the galley blade actuating lever rises pawl 13 is disengaged and bolt 6 retracted, thus permitting the return of the transfer bar preliminary to the presentation of the next line.

The discarded or canceled matter, herein referred to as an assembled or composed line of type, may include a full measure or any part thereof as composed or set up in the line channel preliminary to the transfer to the galley, and in the illustration given it includes all matter indicated between the special justification signal and the next succeeding justification signal as presented in the composing machine, whether the last named signal be normal or special. For example, if the operator, in starting a line, discovers that the first letter designated is incorrect, he immediately makes the special justification signal and proceeds with the designation of the proper letters and completes the line by forming the justification signal appropriate thereto; and the same method is pursued whenever during the formation of the signals for a line it becomes necessary or desirable to kill the matter represented thereby. Although the justification signal with which the special line killing perforations are associated operates as before to set the justification devices and thereby correspondingly control the dimensions of such space type as are included in the line, this function is not utilized but only that of starting the galley mechanism into action, hence any of the numerous justification signals may be employed as a component of the line killing signal.

Having thus described our invention what we claim as new and desire to secure by Letters Patent, is:—

1. A type composing or setting mechanism adapted to set up separate type in lines and to assemble successive lines in column form provided with means for cutting out or discharging an assembled line of type, to prevent its association with the column of matter.

2. A type composing or setting mechanism provided with line forming and line assembling devices and in combination therewith means for diverting a composed line from the line assembling devices and discharging the same.

3. A type composing or setting mechanism provided with means for setting up lines of type and assembling successive lines in column form and in combination therewith means for cutting out or suspending the functions of the line assembling devices to permit the removal of a line.

4. In a type composing or setting mechanism adapted to set up separate type in lines and to assemble successive lines in column form and in combination therewith means for automatically diverting an assembled line from the column.

5. In a type composing mechanism provided with line assembling channel, line carrier, line transferrer and galley and in combination therewith, means for retaining the line transfer in advanced position, to open the line channel for the discharge of the type contained therein.

6. In a type composing mechanism provided with a line assembling channel and a line transferrer movable transversely thereof, to deliver successive lines to the galley and to uncover or open the line channel for the discharge of type contained therein, and in combination therewith, means for retaining the line transferrer in its advanced position, and means for withdrawing the type from the line channel.

7. In a type composing machine the combination with means for assembling the type to form a line, of a plurality of channels for receiving the line one of said channels communicating with and the other leading away from the galley and means for directing the line into either of said channels.

8. In a type composing machine the combination of the following elements, to wit; a line channel in which the type are assembled to form a line; two line receiving channels of which one leads to a galley wherein successive lines are assembled in column form; and controllable means for directing the discharge of an assembled line into either receiving channel.

9. In a type composing machine the combination of the following elements, to wit; a line channel; a line carrier; a galley; and a line transferrer, the latter movable transversely of the line channel to deliver a line to the galley and uncover the discharge end of the line channel so that type assembled therein may be discharged in rear of the transferrer.

10. In a type composing machine the combination of the following elements, to wit; a line channel or receiver; a line carrier; a galley and a line transferrer receiving the type from the line carrier and delivering the same to the galley; said transferrer being provided with a discharge channel adapted to register with the line channel when the transferrer is advanced to deliver a line to the galley.

11. In a type composing machine the combination of the following elements, to wit; a line channel; a line carrier movable longitudinally of the line channel; and a line transferrer movable laterally of the line channel, to advance a line deposited in front of it by the line carrier and to uncover the discharge end of the line channel.

12. In a type composing machine the combination of the following elements, to wit; a line channel; a line carrier movable longitudinally of said line channel; a line transferrer movable transversely of the line channel to advance a line deposited in front of it and to uncover the discharge end of the line channel; and means for retaining the line transferrer in advanced position during a movement of the line carrier to discharge the assembled line.

13. In a type composing machine the combination with the line channel and a line transferrer movable laterally of said channel across the discharge end thereof and provided with a discharge channel for receiving type expelled from the line channel, of beveled guides projecting from the line transferrer on opposite sides of the discharge channel and guided in a recess intersecting the line channel.

14. In a type composing machine provided with a type assembling channel, a line carrier and a line transferrer movable transversely of said channel to uncover or open the latter, of means for locking the line transferrer in its advanced position, to permit the line carrier to discharge type assembled in the line channel before the return of the line transferrer.

15. In a type composing machine provided with a line channel, a galley, and a line transferrer, the latter adapted by its forward or operative movement to open a discharge from the line channel, and in combination therewith controllable means for retaining the line transferrer in its forward position while the type contained in the line channel are being discharged therefrom.

16. In a type composing mechanism the combination of the following elements, to wit; a galley; a galley blade; a line transferrer; and controllable means for restraining the return movement of the transferrer.

17. In a type composing mechanism the combination of the following elements, to wit; a galley; a movable galley blade; a line transferrer and controllable means for temporarily restraining the return of the transferrer including a locking bolt and retaining pawl.

18. In a type composing mechanism provided with a galley, a movable galley blade and a line transferrer and in combination therewith means coupled with the galley blade actuating devices for temporarily suspending the normal movements of the line transferrer.

19. In a type composing mechanism provided with a type assembling channel, line transferrer galley blade and galley and in combination therewith, means for intercepting the return of the line transferrer, and controllable devices for coupling said intercepting means with the galley blade actuating devices.

20. In a type composing mechanism provided with a reciprocatory line transferrer, movable galley blade and galley, and in combination therewith, means for intercepting the movements of the line transferrer, controllable devices for coupling said intercepting means with the galley blade actuating devices, and a retainer for said intercepting means.

21. In a type composing mechanism the combination of the following elements, to wit; a reciprocatory line transferrer; a movable galley blade provided with actuating devices; means for intercepting the line transferrer; controllable means for coupling said intercepting means with the galley blade actuating devices; and a retainer for said intercepting means controlled by the galley-blade actuating devices.

22. In a type composing mechanism the combination of the following elements, to wit; a galley; a movable galley blade provided with actuating devices; a reciprocatory line transferrer; means for intercepting the line transferrer; controllable means for coupling said intercepting means with the galley blade actuating devices; and devices governed by a record strip or preliminary representation device for actuating said controllable means.

23. In a type composing mechanism the combination of the following elements, to wit; a reciprocatory line transferrer; a movable galley-blade provided with actuating mechanism; locking devices for the line transferrer; controllable means for connecting the locking devices and the galley blade actuating mechanism; and a signal interpretating mechanism coupled with said controllable connecting means.

24. In a type composing mechanism the combination of the following elements, to wit; a reciprocatory line transferrer; a movable galley blade provided with actuating mechanism; locking devices for the line transferrer; controllable means for connecting the locking devices and galley-blade actuating mechanism; a retainer for said locking devices controlled by the galley-blade actuating mechanism; and a signal interpretating mechanism coupled with said controllable connecting means.

25. An automatic type composing and setting machine for assembling lines of composed matter in column form provided with automatic means for expelling or cutting out lines of type containing defective or undesired matter.

26. An automatic preliminary-representation-controlled type setting machine for assembling successive lines of type in column form provided with automatic means for diverting from the column undesired lines of type after the same have been composed or set up by the machine.

27. In an automatic preliminary-representation or record-strip controlled type setting machine provided with line forming and assembling devices and in combination therewith means for cutting out or suppressing composed lines of type prior to their assembly in column form.

28. In an automatic type composing machine governed by a preliminary-representation device or record-strip and provided with means for setting up type in lines and assembling successive lines in column form, and in combination therewith, means controlled by the preliminary representation device or record-strip and operating to divert the delivery of individual composed lines away from the column assembling device, to suppress or kill said lines.

29. The combination with a type composing machine provided with means for setting up type in lines and assembling successive lines in column form, of means for suppressing or killing designated lines by diverting them from the column.

30. The combination with a type composing machine provided with line setting and line assembling devices, of automatic means for suppressing or killing a composed line by diverting it from the line assembling devices.

31. The combination with a type composing machine provided with line setting and line assembling devices, of automatic line suppressing or killing means controlled by a preliminary representation device or record strip and operating to divert a composed line of type from the galley and discharge it from the machine.

32. In a type composing machine the combination of the following elements, to wit; a line composing mechanism; line assembling devices; and means for automatically excluding composed lines from the column, including a record strip, signal interpretating devices, and coupling devices controlled by said signal interpretating devices.

33. In a type composing machine the combination of the following elements, to wit; means for setting up a line of type; means for assembling successive lines in column, including a type carrier and line transferrer; means for diverting a composed line from the line transferrer; a record strip or preliminary representation device provided with line killing signals, and signal interpretating devices controlling the action of the line diverting means.

34. In a type composing machine adapted to be governed in its action by a preliminary representation device or record strip and provided with line composing and assembling devices and in combination therewith means for suppressing or killing a line of matter after it is composed or set up and before association with the column the same including means for diverting the line and a signal interpretating mechanism controlled by the preliminary representation device or record strip and in turn controlling said line diverting means.

35. In a record strip controlled composing mechanism the combination of the following elements, to wit; a line channel into which single type are delivered; a line carrier; a line transferrer movable transversely of the line channel to advance a line to the galley and uncover the delivery end of the line channel; actuating devices for the line carrier and line transferrer controlled by the record strip; a lock for the line transferrer; a signal translating mechanism controlled by the record strip; and devices coupling the signal translating mechanism and lock to actuate the latter.

36. In a type composing machine provided with means for setting up type in lines and for assembling successive lines in a galley and in combination therewith means for diverting a composed line away from the galley and means for automatically controlling said diverting means from a record strip including special signal perforations in said strip and a translating mechanism coupled with said line diverting means.

37. In a type composing machine provided with a reciprocatory line transferrer, a galley and a movable galley blade; and in combination therewith, the following elements, to wit; a locking bolt adapted to engage and retain the line transferrer; means for coupling said bolt to the galley blade actuating devices including a revoluble shaft carried by the bolt actuating devices and adapted to interlock with the galley blade actuating devices; a retaining pawl for said bolt; a perforated record strip; and signal translating devices coupled with said revoluble shaft.

JOHN MAURY DOVE.
JOHN SELLERS BANCROFT.
MAURITZ C. INDAHL.

Witnesses:
MORTIMER A. JONES,
JOSEPH B. CHURCH.